United States Patent
Lee et al.

(10) Patent No.: US 12,491,787 B2
(45) Date of Patent: Dec. 9, 2025

(54) ELECTRIC VEHICLE CHARGING FACILITY MULTI-ASSET OPTIMIZATION

(71) Applicant: PowerFlex Systems, LLC, San Diego, CA (US)

(72) Inventors: Zachary J. Lee, Altadena, CA (US);
Robin Guarnotta, La Jolla, CA (US);
Rajat Sethi, San Diego, CA (US);
Justin D. Roethle, Encinitas, CA (US);
Jeffrey William Wright, Sherborn, MA (US); Ted G. Lee, San Marino, CA (US)

(73) Assignee: PowerFlex Systems, LLC, San Diego, CA (US)

( * ) Notice: Subject to any disclaimer, the term of this patent is extended or adjusted under 35 U.S.C. 154(b) by 667 days.

(21) Appl. No.: 17/821,972

(22) Filed: Aug. 24, 2022

(65) Prior Publication Data
US 2024/0067035 A1 Feb. 29, 2024

(51) Int. Cl.
*H02J 7/00* (2006.01)
*B60L 53/302* (2019.01)
(Continued)

(52) U.S. Cl.
CPC ............ *B60L 53/67* (2019.02); *B60L 53/302* (2019.02); *B60L 53/51* (2019.02); *B60L 53/53* (2019.02); *B60L 53/54* (2019.02); *B60L 53/63* (2019.02); *H02J 3/322* (2020.01); *H02J 7/00712* (2020.01); *H02J 7/35* (2013.01); *G06Q 50/06* (2013.01); *H02J 2310/48* (2020.01)

(58) Field of Classification Search
CPC .......... B60L 53/51; B60L 53/54; B60L 53/53; B60L 53/63; B60L 53/67; B60L 3/322
USPC ........................................................ 320/109
See application file for complete search history.

(56) References Cited

U.S. PATENT DOCUMENTS

| | | | |
|---|---|---|---|
| 2003/0111972 A1* | 6/2003 | Strothmann | B60L 50/00 318/268 |
| 2009/0200988 A1* | 8/2009 | Bridges | B60L 55/00 320/137 |

(Continued)

OTHER PUBLICATIONS

International Search Report issued on Nov. 2, 2023 for PCT Application No. PCT/US2023/030927 filed Aug. 23, 2023.

(Continued)

*Primary Examiner* — Alexis B Pacheco
(74) *Attorney, Agent, or Firm* — Dinsmore & Shohl LLP

(57) ABSTRACT

Certain aspects of the present disclosure provide techniques for electric vehicle charging management. In one example, a method includes: building a graph representing an electrical topology of the electric vehicle charging facility and producing an updated graph by updating a state of the one or more network nodes based on electric current or power flow through the one or more passive electric components and updating a state of the one or more component nodes based on electric current or power produced or consumed by the one or more active electric components. The method further includes receiving a selected control strategy for the electric vehicle charging facility and adjusting an electric current or a power draw of an electric vehicle charging station in the electric vehicle charging facility based on the updated graph and the selected control strategy.

20 Claims, 9 Drawing Sheets

(51) Int. Cl.

| | |
|---|---|
| *B60L 53/51* | (2019.01) |
| *B60L 53/53* | (2019.01) |
| *B60L 53/54* | (2019.01) |
| *B60L 53/63* | (2019.01) |
| *B60L 53/67* | (2019.01) |
| *H02J 3/32* | (2006.01) |
| *H02J 7/14* | (2006.01) |
| *H02J 7/35* | (2006.01) |
| *G06Q 50/06* | (2012.01) |

(56) References Cited

U.S. PATENT DOCUMENTS

| | | | |
|---|---|---|---|
| 2015/0226572 A1* | 8/2015 | North | B60L 53/68 701/400 |
| 2015/0346698 A1 | 12/2015 | Mailloux et al. | |
| 2017/0166074 A1 | 6/2017 | Pflaum et al. | |
| 2017/0279170 A1* | 9/2017 | O'Hora | H01M 50/204 |
| 2020/0101859 A1 | 4/2020 | Baxter et al. | |
| 2020/0254896 A1 | 8/2020 | Lee et al. | |
| 2021/0070186 A1* | 3/2021 | Miftakhov | B60L 53/305 |
| 2021/0110446 A1 | 4/2021 | Khoo et al. | |
| 2021/0273478 A1* | 9/2021 | Ambroziak | G06Q 30/04 |
| 2021/0276447 A1 | 9/2021 | Kumar et al. | |
| 2022/0001762 A1* | 1/2022 | Farkas | H02J 7/0045 |
| 2022/0258637 A1 | 8/2022 | Chow et al. | |

OTHER PUBLICATIONS

Fermín Barrero-González et al., "Control Strategy for Electric Vehicle Charging Station Power Converters with Active Functions"; Energies 2019, 12, 3971; 18 pages; retrieved from: https://www.mdpi.com/1996-1073/12/20/3971/pdf?version=1571402844.

Md Safayatullah et al.; "A Comprehensive Review of Power Converter Topologies and Control Methods for Electric Vehicle Fast Charging Applications"; IEEE Access; 41 pages; retrieved from: http://ieeexplore.ieee.org/stamp/stamp.jsp?arnumber=9755960.

* cited by examiner

ELECTRIC VEHICLE CHARGING FACILITY MULTI-ASSET OPTIMIZATION

INTRODUCTION

Aspects of the present disclosure relate to systems and methods for optimizing a facility, such as a building or a collection of buildings, an electric vehicle charging station, or an electric vehicle charging facility.

Electric vehicles, including plug-in hybrid and fully electric vehicles, are increasing in popularity around the world. It is expected that the proportion of new electric vehicles sold each year out of the total number of vehicles sold will continue to rise for the foreseeable future. Moreover, while electric vehicle operators are primarily non-commercial at present (e.g., personal vehicles), commercial vehicle operators are increasingly adding electric vehicles to their fleets for all sorts of commercial operations, thus adding to the number of electric vehicles in operation throughout the world.

The shift from internal combustion engine-powered vehicles to electric vehicles requires significant supporting infrastructure anywhere electric vehicles are operated. For example, electric vehicle charging stations, sometimes referred to as electric vehicle supply equipment, need to be widely distributed so that operators of electric vehicles are able to traverse the existing roadways without issue.

Electric vehicle charging stations and facilities may draw electricity from an electrical grid to charge electric vehicles. In some instances, however, the electric vehicle charging stations or facilities may draw so much electrical power from the grid that certain components in the grid become overloaded. The electric vehicle charging stations or facilities may even cause instabilities in the grid. For example, when there are many electric vehicles charging at a facility and the facility has no process for limiting or controlling the electrical power draw of the charging stations, each charging station may try to draw as much electricity as it can from the grid, which may result in overloaded grid components or grid instabilities.

Accordingly, there is a need for improved methods for managing electric vehicle charging infrastructure.

SUMMARY

A first aspect provides a method for controlling electrical components at an electric vehicle charging facility. The method includes building a graph representing an electrical topology of the electric vehicle charging facility. The graph includes one or more network nodes representing one or more passive electric components in the electric vehicle charging facility and one or more component nodes representing one or more active electric components in the electric vehicle charging facility that produce or consume electric power. The method also includes producing an updated graph by updating a state of the one or more network nodes based on electric current or power flow through the one or more passive electric components and updating a state of the one or more component nodes based on electric current or power produced or consumed by the one or more active electric components. The method further includes receiving a selected control strategy for the electric vehicle charging facility and adjusting an electric current or a power draw of an electric vehicle charging station in the electric vehicle charging facility based on the updated graph and the selected control strategy.

A second aspect provides a system for controlling electrical components at an electric vehicle charging facility. The system includes a memory and one or more processors communicatively coupled to the memory. The one or more processors build a graph representing an electrical topology of the electric vehicle charging facility. The graph includes one or more network nodes representing one or more passive electric components in the electric vehicle charging facility and one or more component nodes representing one or more active electric components in the electric vehicle charging facility that produce or consume electric power. The one or more processors also produce an updated graph by updating a state of the one or more network nodes based on electric current or power flow through the one or more passive electric components and updating a state of the one or more component nodes based on electric current or power produced or consumed by the one or more active electric components. The processors further receive a selected control strategy for the electric vehicle charging facility and adjust an electric current or a power draw of an electric vehicle charging station in the electric vehicle charging facility based on the updated graph and the selected control strategy.

A third aspect provides an electric vehicle charging facility that includes one or more electric vehicle charging stations, one or more active electric components, one or more passive electric components, and a facility controller. The facility controller includes a memory and one or more processors communicatively coupled to the memory. The one or more processors build a graph representing an electrical topology of the electric vehicle charging facility. The graph includes one or more network nodes representing the one or more passive electric components and one or more component nodes representing the one or more active electric components. The one or more processors also produce an updated graph by updating a state of the one or more network nodes based on electric current or power flow through the one or more passive electric components and updating a state of the one or more component nodes based on electric current or power produced or consumed by the one or more active electric components. The one or more processors further receive a selected control strategy for the electric vehicle charging facility and adjust an electric current or a power draw of the one or more electric vehicle charging stations based on the updated graph and the selected control strategy.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Aspects of the present disclosure relate to adjusting the operation of electric vehicle charging facilities. Electric vehicle charging facilities may use electricity supplied from electrical grids to power multiple charging stations. The electric vehicle charging facilities may also include other power sources, such as solar panels, that can be used to supplement or replace some of the electricity that would otherwise be drawn from the electrical grids. A challenge facing these electric vehicle charging facilities is how to adjust or balance the electricity usage from the electrical grids and the other power sources to accomplish different goals (e.g., avoid overloading or destabilizing the electrical grids, increase electricity usage from renewable energy sources, etc.).

The present disclosure describes a system for operating an electric vehicle charging facility. Generally, the system utilizes a graph with nodes that represent different electrical components (e.g., passive electrical components and active electrical components) in the electric vehicle charging facility. The system uses this graph to analyze the electricity usage in the electric vehicle charging facility. The system may analyze the graph and determine adjustments to the operation of the electric vehicle charging facility to accomplish a desired objective or goal (e.g., reducing energy costs, charging using only solar energy, reducing greenhouse gas emissions, responding to demand response events in the electric grid, reducing load variations, not exporting energy to the grid, or reducing the time it takes to charge one or more electric vehicles). The system then adjusts the operation of the electric vehicle charging facility (e.g., adjusting the flow of electric current in the electric vehicle charging facility) using the determined adjustment. In this manner, the system quickly and efficiently optimizes the operation of the electric vehicle charging facility to achieve desired objectives.

In some embodiments, the system provides several technical advantages in electrical power systems. For example, the system may reduce instabilities in an electric power grid by adjusting the electrical power draw of electric vehicle charging stations to reduce or limit the amount of electricity drawn from the grid. The system may further reduce grid instabilities by providing electric power back to the grid from alternative power sources (e.g., solar collectors and batteries, thermal storage, or a fuel cell). As another example, the system may prevent certain grid components from overloading by reducing the electric power that the charging stations draw from the grid. The system may also reduce greenhouse gas emissions resulting from electricity generation by increasing the amount of electricity from green sources (e.g., solar collectors or thermal storage) that the charging stations use.

Example Vehicle Charging Facility

Figure 1:
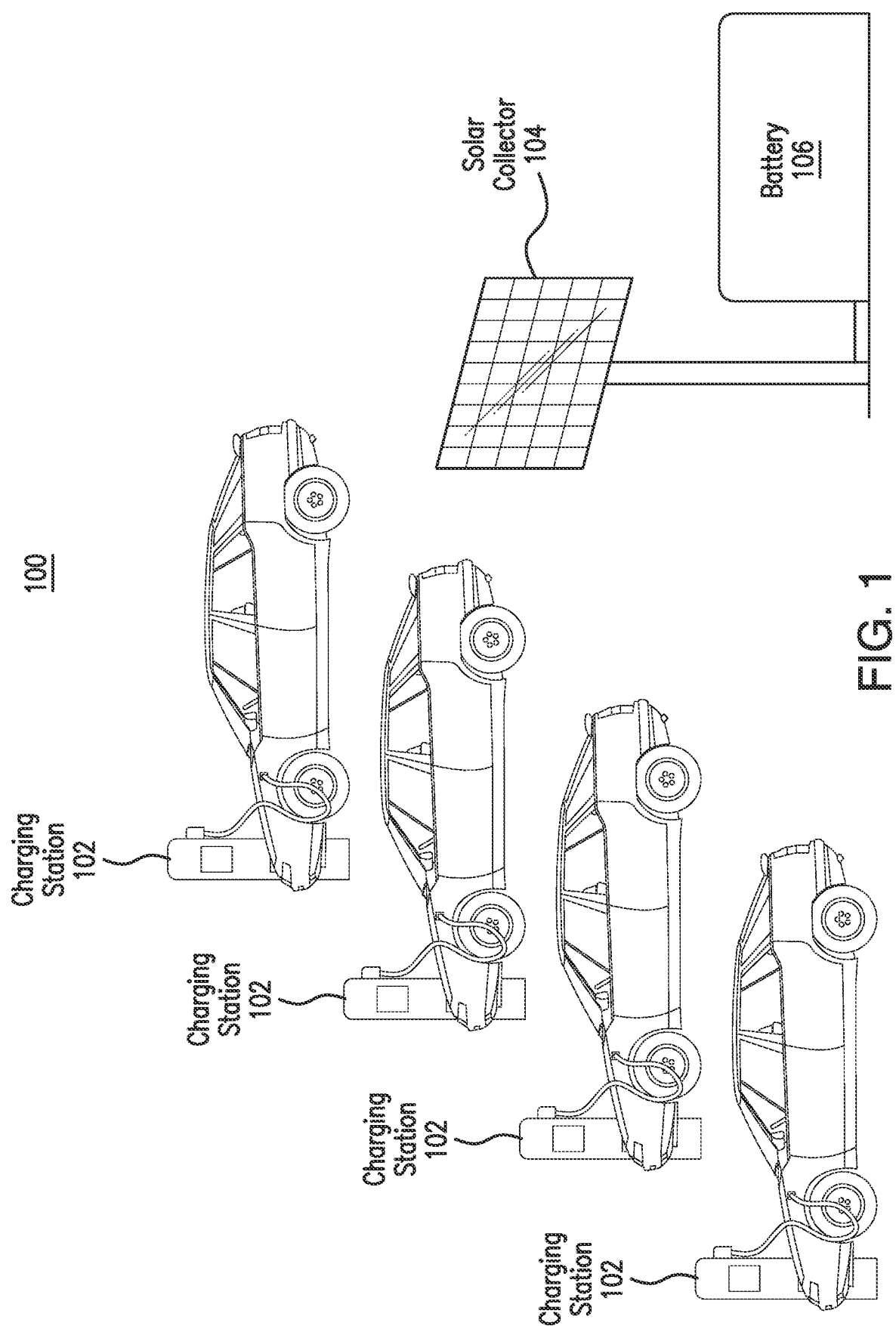
FIG. 1 depicts an example electric vehicle charging facility.

FIG. 1 depicts an example electric vehicle charging facility 100. As seen in FIG. 1, the facility 100 includes one or more charging stations 102, a solar collector 104 (e.g., which may include a photovoltaic panel), and a battery 106. One or more electric vehicles may connect to the charging stations 102 to charge batteries within the vehicles. Electric power may be supplied to the charging stations 102 using a number of different systems. For example, the charging stations 102 may be connected to an underlying electrical infrastructure (e.g., an electrical grid) that supplies power to the charging stations 102. As another example, the charging stations 102 may receive electric power from the solar collector 104 or the battery 106. The charging stations 102 may also receive electric power derived from other power sources (e.g., a generator, fuel cells, or thermal storage).

Figure 2:
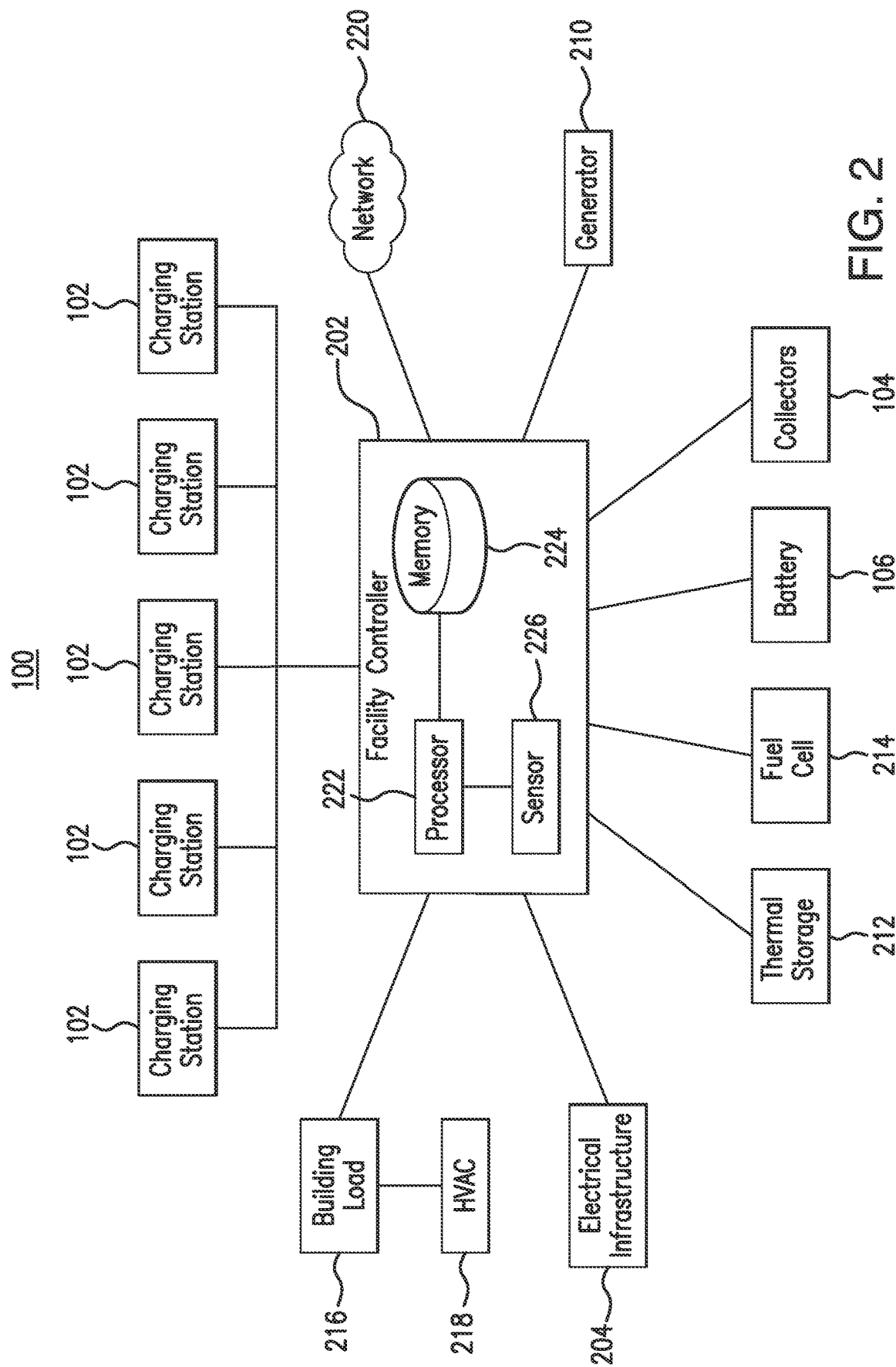
FIG. 2 depicts example components of the electric vehicle charging facility of FIG. 1.

The facility 100 may include a facility controller (as shown in FIG. 2) that adjusts the electric current or power draw of the charging stations 102 and from which power sources the charging stations 102 draw electric power. For example, an administrator of the facility 100 may provide the facility controller with one or more objectives, and the facility controller may adjust the electric power draw of the charging stations 102 to try to achieve the provided objective. For example, the administrator may instruct the facility controller to reduce energy costs of the facility 100, charge vehicles using only solar energy, reduce greenhouse gas emissions of the facility 100, respond to demand response events in the facility 100, reduce load variations in the facility 100, not export electric energy to an electric grid, or reduce the time to charge a vehicle.

The facility controller may analyze the provided objective and adjust the electric current or power draw of the charging stations 102 in the facility 100 to try to achieve the provided objective. For example, the facility controller may reduce the electric current or power draw from the electric grid to the charging stations 102. As another example, the facility controller may increase the electric current or electric power from the battery 106 to the charging stations 102. In certain embodiments, by adjusting the electric current or power draw of the charging stations 102 and the power sources that the charging stations 102 use, the facility 100 reduces the demand on the electric grid, or improves the user experience while charging an electric vehicle.

FIG. 2 depicts example components of the electric vehicle charging facility 100 of FIG. 1. As seen in FIG. 2, the electric vehicle charging facility 100 includes one or more charging stations 102, one or more collectors 104, and one or more batteries 106. The facility 100 also includes a facility controller 202, electrical infrastructure 204, a generator 210, thermal storage 212, one or more fuel cells 214, a building load 216, and a network 220. In certain embodiments, the facility controller 202 analyzes the electrical needs of the components of the facility 100 and adjusts the electrical current or power draw from various power sources in the facility 100 to meet the needs and objectives of the facility 100. Note that the facility 100 shown in FIG. 2 is an example, and other electric vehicle charging facilities may include additional elements, omit elements, and may have generally different arrangements of elements.

As discussed previously, electric vehicles may connect to the charging stations 102 to recharge the electric vehicles. Each charging station 102 may be provided electric power from a power source controlled by the facility controller 202. For example, a charging station 102 may receive electrical power from the electrical infrastructure 204, the thermal storage 212, the fuel cell 214, the battery 106, the collectors 104, or the generator 210. The facility controller 202 may adjust the electric current or power provided by each of these power sources to the charging station 102 to satisfy certain objectives provided by an administrator of the facility 100. The charging station 102 transfers the electric current or power provided by the facility controller 202 to a connected electric vehicle to recharge the electric vehicle.

The facility controller 202 connects to other components in the facility 100 to control the flow of electric current or power within the facility 100. The facility controller 202 may connect to these components through any suitable type of connections (e.g., direct connection, wired connection, wireless fidelity connection, Zigbee connection, and Bluetooth connection). As seen in FIG. 2, the facility controller 202 includes a processor 222, a memory 224, and one or more sensors 226. The facility controller 202 may include any suitable number of processors 222 and memories 224. The processor 222 and the memory 224 may be arranged to perform any of the functions of the facility controller 202 described herein.

The processor 222 is any electronic circuitry, including, but not limited to one or a combination of microprocessors, microcontrollers, application specific integrated circuits (ASIC), application specific instruction set processor (ASIP), and/or state machines, that communicatively couples to memory 224 and controls the operation of the facility controller 202. The processor 222 may be 8-bit, 16-bit, 32-bit, 64-bit or of any other suitable architecture. The processor 222 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 222 may include other hardware that operates software to control and process information. The processor 222 executes software stored on the memory 224 to perform any of the functions described herein. The processor 222 controls the operation and administration of the facility controller 202 by processing information (e.g., information received from the charging stations 102, electrical infrastructure 204, and memory 224). The processor 222 is not limited to a single processing device and may encompass multiple processing devices.

The memory 224 may store, either permanently or temporarily, data, operational software, or other information for the processor 222. The memory 224 may include any one or a combination of volatile or non-volatile local or remote devices suitable for storing information. For example, the memory 224 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 224, a disk, a CD, or a flash drive. In particular embodiments, the software may include an application executable by the processor 222 to perform one or more of the functions described herein.

Generally, the facility controller 202 uses the one or more sensors 226 to detect the electric current or power produced or consumed by the components in the facility 100. For example, the facility controller 202 may use the one or more sensors 226 to detect the electric current or power consumed by the charging stations 102 or the building load 216. As another example, the facility controller 202 may use the sensors 226 to detect the electric current or power provided or consumed by the collectors 104, the battery 106, the electrical infrastructure 204, the generator 210, the thermal storage 212, or the fuel cell 214. The facility controller 202 may also use the one or more sensors 226 to detect the electric current or power flowing through a passive electrical component in the facility 100 (e.g., a line, transformer, breaker, etc.). For example, current clamps with data connections to the facility controller 202 may be attached to the passive electrical components to detect electric current passing through the components. The facility controller 202 may analyze the electric current or power measured by the sensors 226 to adjust the electric current or power draw of various components in the facility 100 to meet certain objectives provided by an administrator or user of the facility 100 (e.g., by interacting with the facility controller 202 using a computer or mobile device), in some embodiments.

In some embodiments, the facility controller 202 uses a graph data structure representing the electrical infrastructure of facility 100 to determine how to adjust the electric current or power within the facility 100. In some aspects, the facility controller 202 may construct the graph based on an electrical topology of the facility 100. For example, the graph may include nodes that represent the active and passive electrical components in the facility 100. An edge between two nodes may indicate that the active and passive electrical components represented by those nodes are electrically connected in the facility 100. Each of the nodes may be a data structure that exposes certain functions that the facility controller 202 may call to retrieve or determine certain electrical information about the active or passive electrical component represented by that node. For example, the facility controller 202 may call certain functions exposed by a node to determine the electrical current or power draw of the active and passive electrical component represented by that node. The facility controller 202 may call any suitable number of functions of any suitable number of nodes to determine the most up to date electrical information for the facility 100.

The facility controller 202 may analyze the graph and the information in the graph and determine how best to adjust the electric current or power draw in the facility 100 to achieve certain objectives provided by an administrator of the facility 100. In this manner, the facility controller 202 controls the flow of electricity to and from the facility 100 to realize certain technical advantages, in some embodiments. For example, the facility controller 202 may improve grid stability by reducing or limiting the electrical power that the charging stations 102 may draw from the electrical grid (e.g., as opposed to letting the charging stations 102 draw as much electricity from the grid as possible). Additionally, the facility controller 202 may prevent certain grid components from overloading. As another example, the facility controller 202 may improve the environmental impact of the facility 100 by increasing the amount of electricity that the charging stations use from green power sources (e.g., the solar collectors 104 and the thermal storage 212).

The electrical infrastructure 204 may include connections to an external electrical grid (not depicted) that supplies electric power to the facility 100. The electrical infrastructure 204 may be any suitable type of electrical system. For example, the electrical infrastructure 204 may be a single phase electrical system or a multiphase electrical system. The facility controller 202 may connect to the electrical infrastructure 204 to draw electric current or power from the electrical grid. For example, the electrical infrastructure 204 may supply power produced by an upstream power plant. The electric current or power provided by the electrical infrastructure 204 may be charged to the facility 100 or to the owners of electric vehicles charging at the charging stations 102. In some embodiments, the electrical infrastructure 204 may provide electric power on demand, but using the electrical infrastructure 204 may increase the carbon footprint of the facility 100 and the operating costs of the facility 100.

The generator 210 may be any suitable electric generator that provides electric current or power to the facility 100. For example, the generator 210 may be a natural gas, diesel, propane, or biofuel powered generator. The generator 210 may burn one or more of these fuels to generate electric power for the facility 100. The facility controller 202 may use the electric power generated by the generator 210 to power other components in the facility 100, such as the charging stations 102 or the building load 216. The generator 210 may be used to provide electric power to the facility 100 when the grid is heavily loaded or when the cost to use electricity from the grid is high or when power from the external grid is unavailable (e.g., during a blackout).

The thermal storage 212 stores thermal energy that may be used at a later time. The thermal storage 212 may receive thermal energy through one or more heat collectors (e.g., the one or more solar collectors 104) or by using electricity to warm or cool a medium. The thermal storage 212 may include a fluid, or other medium, that stores the collected thermal energy. This thermal energy may be subsequently discharged to produce electricity (e.g., to heat water to produce steam that is used to generate electricity) for the facility 100. In some embodiments, the thermal storage 212 collects and stores heat energy that is later used to provide electricity when the grid is heavily loaded or when the cost to use electricity from the grid is high. Thermal storage may also be used to supplement HVAC needs directly. For example, instead of using electricity drawn from the external grid to produce heat, the thermal storage could provide heat for a building or industrial process.

The fuel cell 214 uses the chemical energy of a fuel to produce electricity. For example, the fuel cell 214 may use the chemical energy in hydrogen to produce electricity for the facility 100. In some embodiments, the facility 100 uses the electric current or power provided by the fuel cell 214 when the grid is heavily loaded or when using electricity from the grid is costly.

The collectors 104 and the battery 106 may form a solar collection system that provides electricity to the facility 100. For example, the collectors 104 may use solar energy to produce electric power. This electrical energy may then be stored in the battery 106 or consumed by other components in the facility 100 (e.g., the charging stations 102 or building load 216). The solar collection system may reduce the electric current or power that the facility 100 consumes from the electrical infrastructure 204.

The facility 100 may include one or more buildings. For example, the facility 100 may include an office building, a parking garage, a grocery store, etc. (not depicted). The charging stations 102 may be positioned adjacent to or within the building. The building may consume electric current or power. For example, the building may include lights or a heating ventilation and air conditioning (HVAC) system 218. As a result, the building includes a building load 216 that uses electric power. For example, when the lights in the building are on and the HVAC system 218 is operating, the electric current or power draw of the facility 100 increases. The facility controller 202 adjusts the electric current or power flowing in the facility 100 to provide electric current or power to the building load 216 or the HVAC system 218 in conjunction with the charging stations 102.

The facility controller 202 connects to other components through the network 220. For example, the facility controller 202 may connect to other controllers or other facilities through the network 220. The network 220 is any suitable network operable to facilitate communication. The network 220 may include any interconnecting system capable of transmitting audio, video, signals, data, messages, or any combination of the preceding. The network 220 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Figure 3:
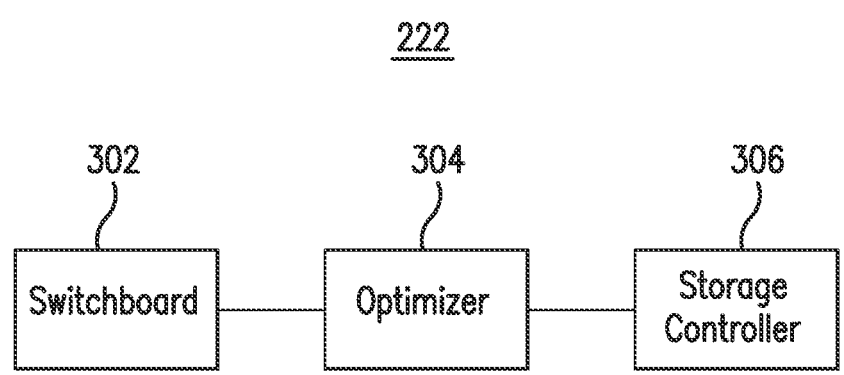
FIG. 3 depicts an example processor of the facility controller of the electric vehicle charging facility of FIG. 1.

FIG. 3 depicts an example processor 222 of the facility controller 202 of the electric vehicle charging facility 100 of FIG. 1. As seen in FIG. 3, the processor 222 implements several components or modules, such as a switchboard 302, an optimizer 304, and a storage controller 306. In certain embodiments, these components or modules analyze the electric current flow or power draw of the facility 100 and adjust the electric current or power draw of the facility 100 to meet or satisfy certain objectives provided by an administrator of the facility 100.

The switchboard 302 is a module or component that gathers electrical information from other components of the facility 100. The switchboard 302 also generates and dispatches set points to other components of the facility 100. For example, the switchboard 302 may use one or more sensors 226 of the facility controller 202 (shown in FIG. 2) to measure the electric current or power consumption or production of components in the facility 100. The switchboard 302 may then package and communicate this information to the optimizer 304. When the optimizer 304 returns the results of a process for optimizing the electric current or power draw of the facility 100 (e.g., to achieve an administrator or user provided objective) to the switchboard 302, the switchboard 302 uses those results to generate and dispatch set points to other components of the facility 100. The set points may be messages or instructions that control how much electric power may be produced or consumed by a component over a period of time. For example, the switchboard 302 may instruct certain charging stations 102 to limit their electric current or power draw from the grid. As another example, the switchboard my instruct certain energy sources (e.g., the generator 210 or battery 106) to dispatch electric current or power to reduce or eliminate the need to draw electrical power from an external grid.

The optimizer 304 is a component or module of the facility controller 202 that uses information from the switchboard 302 to determine how to adjust electric current or power draw in the facility 100 to achieve one or more objectives. In certain embodiments, the optimizer 304 generates or utilizes an existing graph representing the electrical topology of the facility 100. The graph may include nodes representing active and passive electric components in the facility 100. The optimizer 304 may map each node to the corresponding electric current or power draw information provided by the switchboard 302. The optimizer 304 may use an optimization process that analyzes the graph to determine a strategy for adjusting the electric current or power draw of one or more components in the facility 100 to achieve the objective. The optimizer 304 may output the results of this process to the switchboard 302 to inform the switchboard 302 how to adjust the electric current or power draw in the facility 100.

The storage controller 306 may be part of the processor 222 or a separate controller or processor in the facility 100. The storage controller 306 manages or controls the energy storage components in the facility 100. For example, the storage controller 306 may instruct the battery 106 or the thermal storage 212 (shown in FIG. 2) to store energy or to dispatch stored energy. For example, the storage controller 306 may determine, based on results from the optimizer 304 (e.g., a set point for the power or current that a storage asset should charge or discharge), that the battery 106 or the thermal storage 212 should begin dispatching stored energy. In response, the battery 106 or the thermal storage 212 may begin dispatching stored energy to the electrical infrastructure 204 which may be used within facility 100 or exported to the external electrical grid. Within facility 100, the dispatched energy from battery 106 or the thermal storage 212 may be used to offset the energy drawn by charging stations 102. As another example, the storage controller 306 may instruct the battery 106 or the thermal storage 212 to build up energy storage rather than dispatching stored energy. In response, the battery 106 or the thermal storage 212 may draw energy through the electrical infrastructure 204, either from local generation or from the external grid. In this manner, the storage controller 306 controls the flow of electric energy to and from the energy storage components in the facility 100. In embodiments where the storage controller 306 is separate from the processor 222 and the facility controller 202, the facility 100 may include any suitable number of storage controllers 306. For example, the facility 100 may include a storage controller 306 for each type of energy storage in the facility 100 (e.g., solar storage, thermal storage, etc.).

In some embodiments, the storage controller 306 may override or disregard adjustments to the electric current or power flow determined by the facility controller 202. For example, the optimizer 304 may determine, based on the forecasted production of the solar collectors 104, that the battery 106 should charge by drawing energy from the electrical infrastructure 204. However, the storage controller 306, may determine, based on near real-time measurements, that the energy produced by the solar collector 104 or the load from the building differ from their forecasted values. The storage controller may then override the instruction from the optimizer 304 if following that instruction would violate operational rules or significantly reduce operational objectives. For example, if the optimizer 304 sends an instruction for a battery 106 to charge, but the storage controller 306 detects that this would lead to an increase in the peak power draw of the facility 100, the storage controller 306 may instruct the battery 106 to charge at a lower rate or no charge at all to avoid high costs from the external grid. In another example, the storage controller 306 may override an instruction for the battery 106 to discharge if doing so would cause the site to export power to the external grid when doing so is prohibited.

Example Operation for Vehicle Charging Facility

Figure 4:
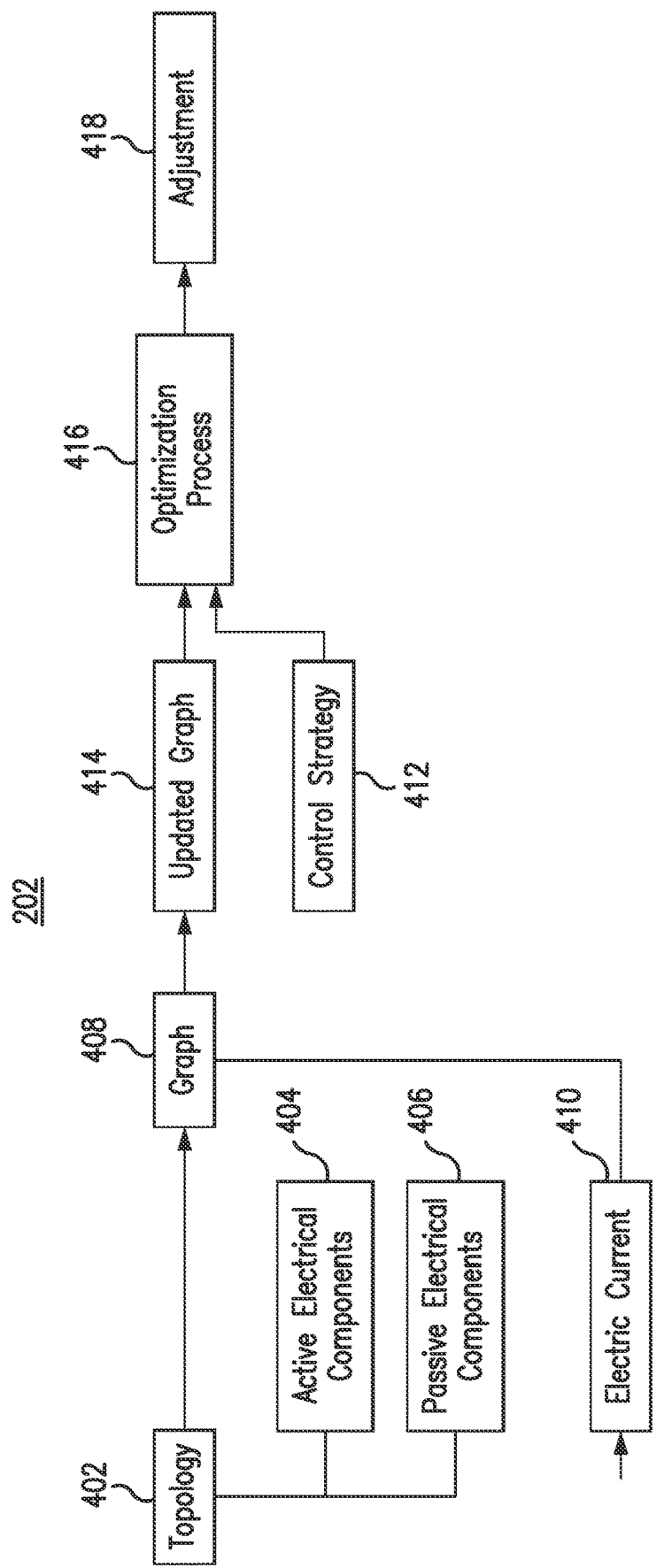
FIG. 4 depicts example operations of the electric vehicle charging facility of FIG. 1.

FIG. 4 depicts example operations of the electric vehicle charging facility 100 of FIG. 1. Specifically, FIG. 4 shows an example operation of the facility controller 202. In this example, the facility controller 202 creates a graph that represents the electrical topology of the facility 100. The graph includes nodes representing the active and passive electrical components in the facility 100. The edges between the nodes indicate a connection between the active or passive electrical components represented the nodes. The facility controller 202 updates each node in the graph with electrical current or electric power draw information for the component in the facility 100 corresponding to the node. The facility controller 202 then uses an optimization process to analyze the graph to determine how best to adjust the electric current or the electric power in the facility 100 to achieve particular objectives or control strategies provided by an administrator of the facility 100. In this manner, the facility controller 202 automatically adjusts and calibrates the flow of electric current in the facility 100 to achieve a desired objective or control strategy, in certain embodiments.

In one aspect, the facility controller 202 begins with an electric topology 402 of the facility 100. The electric topology 402 may be provided as an input to the facility controller 202. An administrator of the facility 100 may have provided the electric topology 402. In some embodiments, the facility controller 202 determines the electric topology 402 of the facility 100. For example, the facility controller 202 may sense or detect components that are connected to the facility controller 202. By sensing these connections, the facility controller 202 may generate or determine the electric topology 402 for the facility 100.

The electric topology 402 indicates various electrical components within the facility 100. In the example of FIG. 4, the electric topology 402 identifies active electrical components 404 and passive electrical components 406 in the facility 100. The active electrical components 404 may include any component in the facility 100 which produces or consumes electric power. The passive electrical components 406 include elements like lines, breakers, panels, and transformers that pass electrical current and power and they may or may not have limits on the current or power that passes through them. The electric topology 402 may also indicate how the active electrical components 404 and the passive electrical components 406 are connected to each other. For example, the electric topology 402 may indicate the passive electrical components 406 that connect the active electrical components 404 to each other.

The facility controller 202 generates a graph 408 based on the electric topology 402. The graph 408 includes nodes representing the active electrical components 404 and the passive electrical components 406 in the electric topology 402. The nodes may be connected by edges that correspond to the connections between the active electrical components 404 and the passive electrical components 406. As a result, the graph 408 represents the electrical components within the facility 100 and the connections between these electrical components in the facility 100.

The facility controller 202 uses an object oriented approach to generate and store the graph 408. Each node in the graph 408 may be a software object that represents an active electrical component 404 or a passive electrical component 406. The nodes may include information about the electrical components represented by the nodes. For example, the nodes may include the electrical current or power flowing through the electrical components represented by the nodes. The nodes may also expose certain functions to the facility controller 202. For example, each node of the graph 408 may expose functions that the facility controller 202 may call to receive or determine the electric current or power produced by, consumed by, or flowing through the electrical component represented by that node. Additionally, some nodes of the graph 408 may expose functions that the facility controller 202 may call to receive or determine the values of variables that affect the operation of the electrical components represented by those nodes.

The facility controller 202 updates the graph 408 with information indicating the electrical current, power flow, or voltage at the components represented by the nodes of the graph 408. As discussed previously, this information may have been provided by one or more sensors 226 of the facility controller 202 (shown in FIG. 2). For example, the facility controller 202 may sense or measure the electrical current or power flowing through the active electrical components 404 and the passive electrical components 406 of the facility 100. It may also sense or measure the voltage at the active electrical components 404 and the passive electrical components 406. The facility controller 202 may call functions exposed by nodes in the graph 408 to receive or determine the electrical current or power flowing through the electrical components represented by those nodes. The facility controller 202 may then update the states of the nodes in the graph 408 with the measured or sensed electrical current or power. In the example of FIG. 4, the facility controller 202 receives the electric current 410 measured by the one or more sensors 226. The electric current 410 may include measurements of multiple electric currents flowing through multiple active electrical components 404 and passive electrical components 406 in the facility 100. The facility controller 202 updates the graph 408 with the electric current 410. Specifically, the facility controller 202 updates the information in the nodes of the graph 408 to indicate the electric current 410 measured for the active electrical components 404 and/or the passive electrical components 406 corresponding to those nodes. By updating the nodes in the graph 408, the facility controller 202 produces an updated graph 414. The updated graph 414 includes nodes with the most recently measured electric current, electric power draw, voltage information, and/or resistance/impedance information.

The facility controller 202 also receives a control strategy 412. The control strategy 412 may indicate one or more objectives selected by an administrator of the facility 100. For example, the control strategy 412 may indicate an objective of reducing energy costs of the facility 100, an objective of charging electric vehicles using only solar energy, an objective of reducing greenhouse gas emissions, an objective of responding to demand response events in the electric grid, an objective of reducing load variations, an objective of not exporting energy to the grid, or an objective of reducing the time it takes to charge one or more electric vehicles. The control strategy 412 may indicate any suitable number of objectives desired by the administrator. The facility controller 202 may analyze the updated graph 414 and the control strategy 412 to determine how to adjust the electric current or power flow through the facility 100 to accomplish the desired objectives of the administrator.

The facility controller 202 uses an optimization process 416 to analyze the updated graph 414 and the control strategy 412. For example, the facility controller 202 may use the updated graph 414 and the control strategy 412 as inputs to the optimization process 416. The optimization process 416 may have been designed to determine how the electric current or power in the facility 100 should flow to achieve certain objectives indicated by the control strategy 412 based on the capabilities of each component and the physics described in the graph structure of the updated graph 414. The facility controller 202 analyzes the updated graph 414 to determine the electric current or power flow in the facility 100. The facility controller 202 then determines, according to the optimization process 416, whether the electric current or power flow in the facility 100 will achieve the objectives indicated by the control strategy 412. If the facility controller 202 determines that the electric current or power flow indicated by the updated graph 414 will achieve the objectives in the control strategy 412, the facility controller 202 may determine that no adjustments should be made to the electric current or power flow in the facility 100. If the facility controller 202 determines that the electric current or power flow indicated by the updated graph 414 will not achieve the objectives indicated by the control strategy 412, then the facility controller 202 may determine the adjustments 418 that should be made to the electric current or power flow in the facility 100 to achieve the objectives indicated by the control strategy 412. As discussed previously, the facility controller 202 may generate and dispatch set points to components within the facility 100 to effect the adjustments 418. In this manner, the facility controller 202 determines how to adjust the electric current or power flow in the facility 100 to achieve desired objectives of the control strategy 412.

The optimization process 416, may include an objective function to be minimized and a set of constraints on the variables determined by the optimization process 416. This set of constraints may include limits on the current, power, or voltage at one or more nodes in the network. For example, let $p_i^N \in \mathbb{R}$ be the power through node i and $p_j^C \in \mathbb{R}$ be the power consumed by component j. Then the power through node i can be described by the recursive equation $p_i^N = \Sigma_{k \in N_i} p_k^N + \Sigma_{j \in C_i} p_j^C$ and the limits on the power through node i can be described as $p_i^N \leq \hat{P}_i^N$ which is a linear constraint. Likewise, let where $I \in \mathbb{C}^\phi$ where $\phi$ is the number of phases. Each element in the vector is the complex current through one phase in phasor notation. Generally, $\phi=4$ for phases A, B, C and neutral. The current through node i can then be described by the equation $I_i^N = \Sigma_{k \in N_i} I_k^N + \Sigma_{j \in C_i} I_j^C$ If and a limit on the current through node i may then be described as $\|I_{i,\phi}^N\| \leq \bar{I}_{i,\phi}^N$ for each phase $\phi$. While this constraint is not linear, it is a second order cone constraint which is convex. We assume the voltage at the root node can be measured and is denoted $V_0^N \in \mathbb{C}^\phi$. The voltage of any other node then be expressed as $V_i^N = V_{P_i}^N - Z_i I_i^N$ where $V_{P_i}^N$ is the voltage of node i's parent node, $Z_i$ is the electrical impedance between node i and its parent, and $I_i^N$ is the net current draw into node i from its parent as calculated previously. We can express constraints on this voltage as $\|\hat{V}_{i,\phi} - V_{i,\phi}^N\| \leq \delta_{i,\phi}$ where $\hat{V}_\phi$ is the nominal voltage for the node and $\delta_{i,\phi}$ is the allowable deviation. Each of these constraints can be handled by off-the-shelf optimization solvers. The above formulations are provided merely as examples.

These constraints can be incorporated into a convex optimization problem where the current and/or power of each active component is a variable in the optimization. An example of such an optimization is:

$$\max_{p,I} f(p, I) \quad (1a)$$

such that $$p_i^N = \sum_{k \in N_i} p_k^N + \sum_{j \in C_i} p_j^C \quad (1b)$$

$$I_i^N = \sum_{k \in N_i} I_k^N + \sum_{j \in C_i} I_j^C \quad (1c)$$

$$V_i^N = V_{P_i}^N - Z_i I_i^N \quad (1d)$$

$$p_i^N \leq \overline{p}_i^N \quad (1e)$$

$$\|I_{i,\phi}^N\| \leq \overline{T}_{i,\phi}^N \quad (1f)$$

$$\|\hat{V}_{i,\phi} - V_{i,\phi}^N\| \leq \delta_{i,\phi} \quad (1g)$$

$$p_j^C \in \mathcal{P}_j^C, \, p_i^N \in \mathcal{P}_i^N \quad (1h)$$

$$I_j^C \in \mathcal{T}_j^C, \, I_i^N \in \mathcal{T}_i^N \quad (1i)$$

Here, the objective function (1a) is a function of the power and currents of each node/component in the network. A common example of this is minimizing energy costs, which are based on the total power draw of the network, which is equivalent to the power draw of the root node. Constraints (1b)-(1g) are described above. Constraints (1h) and (1i) describe additional constraints on the current/power of each node/component in the network which might include component limits, such as the maximum power draw of a charging station or battery. These constraints may also be stateful, for example, the maximum power output of a stationary battery may depend on its state of charge. Additional constraints can be added to problem (1) depending on the components in the network and the objectives of the optimization. This problem can be solved using off-the-shelf optimization solvers and methods.

In an alternative implementation, the optimization process 416 may take the form of a prioritization-based algorithm. In this case, each vehicle at a charging session is assigned a prioritization index. Examples of prioritization indexes are arrival time, departure time, remaining energy demand, or laxity. Charging stations are then sorted according to increasing prioritization index (e.g., a small index indicates higher priority). The algorithm first assigns all stations a minimum power allotment, which may be zero or a positive value depending on the configuration of the system. The algorithm then iterates over the list of stations. For each station it assigns the station its maximum charging rate. After each assignment, the graph 414 is updated, and the constraints above are checked. If any of the constraints are violated, then the current and power allocated to the charging station is reduced and the process repeats until the constraints are satisfied or the charging station is allocated no power. The algorithm then continues this process for each charging station in the list.

In another alternative implementation, a binary search algorithm is used to determine the maximum allowable charging rate for each charging station. As before, stations are sorted, then each station is initially assigned a minimum charging power. The algorithm then iterates over the sorted list of charging stations. For each station, the algorithm takes the minimum power as a lower bound and the maximum charging power of the station as an upper bound. The algorithm then assigns the mean of the upper and lower bounds to the station and updates the graph 414. If the constraints on the graph 414 are violated, the upper bound in the binary search algorithm is decreased to the current value, and if the constraints are not violated, the lower bound is increased to the current value. The charging rate of the station is then set to the mean of the upper and lower bounds and the loop continues. The algorithm terminates for a given charging station when the difference between the upper and lower bounds are within some tolerance value of one another. The algorithm then continues this process for each charging station in the list.

Figure 5:
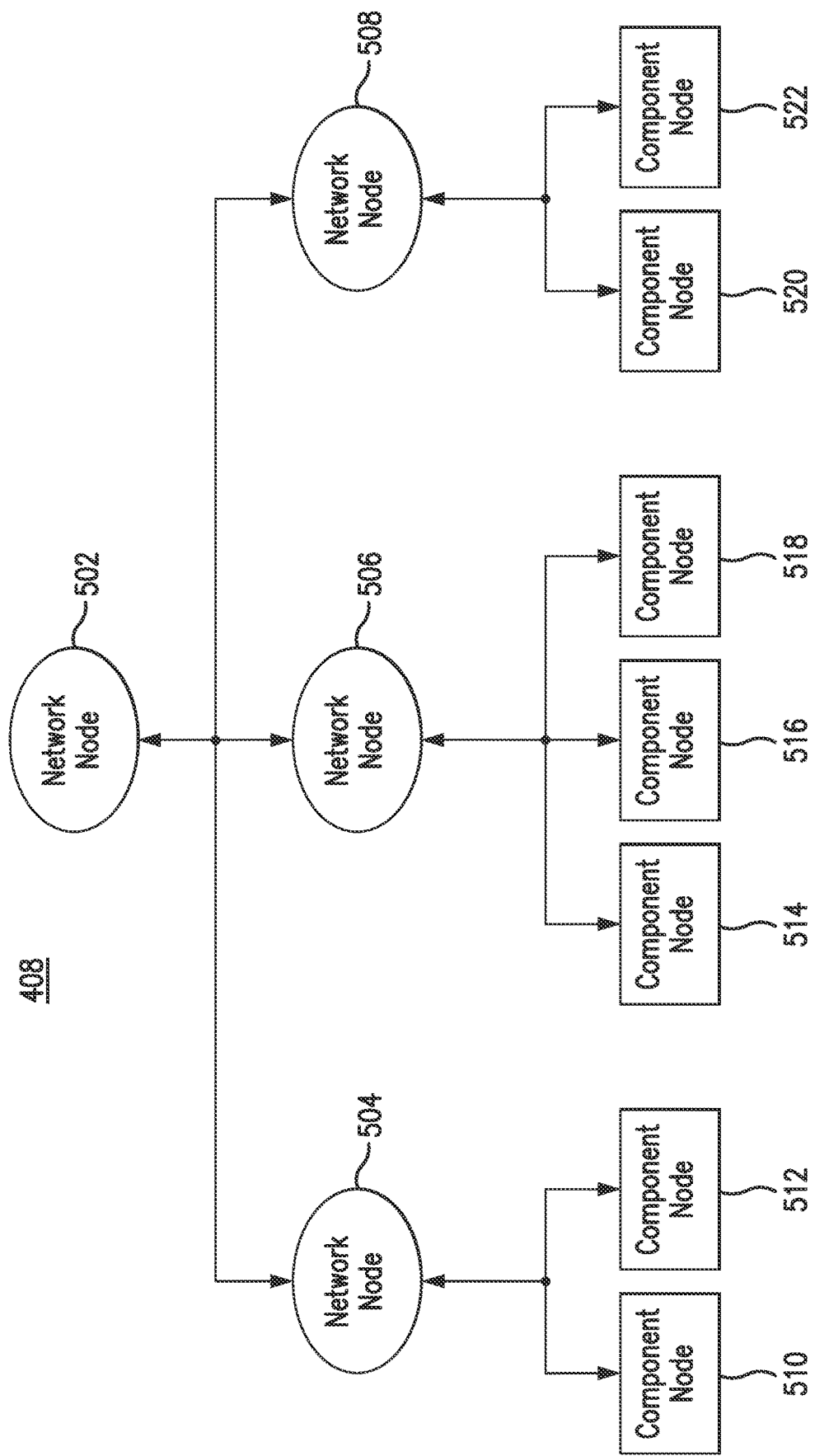
FIG. 5 depicts an example graph used in the electric vehicle charging facility of FIG. 1.

FIG. 5 depicts an example graph 408 used in the electric vehicle charging facility 100 of FIG. 1. As seen in FIG. 5, the graph 408 includes network nodes 502, 504, 506, and 508 and component nodes 510, 512, 514, 516, 518, 520, and 522. Generally, the network nodes 502, 504, 506, and 508 represent passive electrical components like lines, breakers, panels, and transformers in the facility 100. These components may or may not have limits on the electric current that passes through them. The component nodes 510, 512, 514, 516, 518, 520, and 522 represent active electric components in the facility 100 that produce or consume electric power. For example, the component nodes 510, 512, 514, 516, 518, 520, and 522 may represent components, such as charging stations 102, building load 216, and the HVAC system 218 shown in FIG. 2. The edges between the nodes in the graph 408 indicate electrical connections. An edge connecting two nodes in the graph 408 indicates that the active and passive electrical components represented by those nodes are electrically connected.

In the example of FIG. 5, the network node 502 is the root node of the graph 408. The network nodes 504, 506, and 508 are subnodes of the network node 502. The component nodes 510, 512, 514, 516, 518, 520, and 522 are subnodes of the network nodes 504, 506, and 508. The component nodes 510 and 512 are subnodes of the network node 504. The component nodes 514, 516, and 518 are subnodes of the network node 506. The component nodes 520 and 522 are subnodes of the network node 508. Based on the connections shown in the graph 408, the component nodes 510 and 512 represent active electrical components that are connected to a passive electrical component represented by the network node 504. The component nodes 514, 516, and 518 represent active electrical components that are connected to a passive electrical component represented by the network node 506. The component nodes 520 and 522 represent active electrical components connected to a passive electrical component represented by the network node 508. The passive electrical components represented by the nodes 504, 506, and 508 are connected to a passive electrical component represented by the network node 502.

As an example, the component nodes 510, 512, 514, 516, and 518 may represent charging stations 102 in the facility 100. These charging stations 102 may be connected to breakers represented by the network nodes 504 and 506. The component nodes 520 and 522 may represent the building load 216 and the HVAC system 218. These components may be connected to another breaker represented by the network node 508. As indicated by the graph 408, electric current or power may flow through these breakers to the charging stations 102, building load 216, and the HVAC system 218. The facility controller 202 may update and analyze this graph 408 to determine adjustments to the electric current or power in the facility 100. In some embodiments, the facility controller 202 may determine the electrical current or power flowing through a passive electrical component as a function of the electrical current or power flowing through the active electrical components connected to the passive electrical component. For example, the electrical current or power flowing through the passive electrical component represented by the network node 504 may be the sum of the electrical currents flowing through the active electrical components represented by the nodes 510 and 512.

Figure 6:
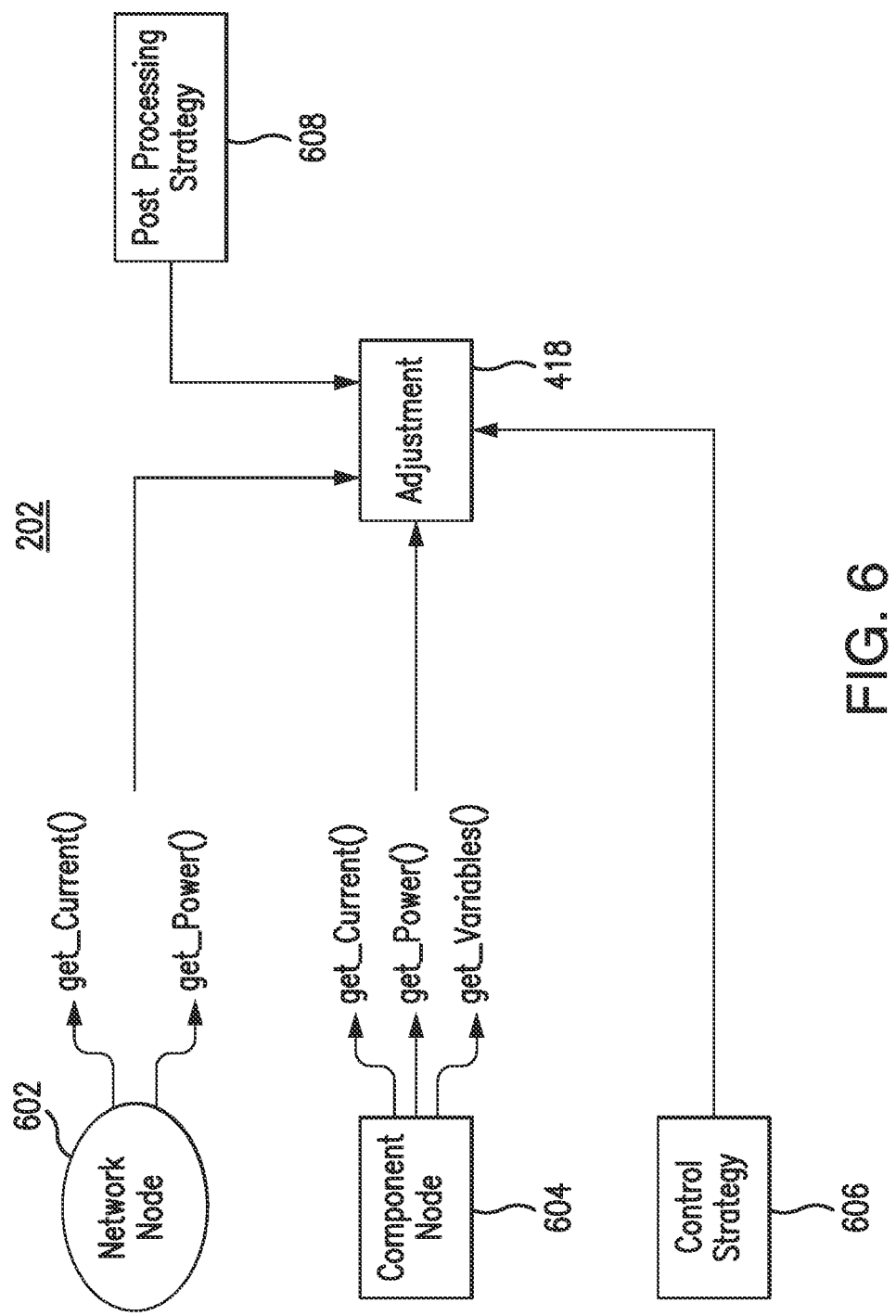
FIG. 6 depicts example graph nodes in the electric vehicle charging facility of FIG. 1.

FIG. 6 depicts example graph nodes in the electric vehicle charging facility 100 of FIG. 1. As seen in FIG. 6, the facility controller 202 may read the state of a network node 602 and/or component node 604 by measuring, sensing, or calculating electric currents or power at those nodes. The facility controller 202 can then update the state of a component node 604 by instructing it to adjust its power or current consumption or generation which may update the state of upstream network nodes in the electrical topology. The network node 602 and the component node 604 may be part of a graph representing the electrical topology of the facility 100.

The facility controller 202 may use an object oriented approach to updating the network node 602 or the component node 604. For example, the network node 602 and the component node 604 may be software objects that expose certain functions that the facility controller 202 may call to access the measured, sensed, or calculated electric current or power through the component represented by the network node 602 or the component node 604. As seen in FIG. 6, the network node 602 and the component node 604 expose two functions get Current( ) and get Power( ) The facility controller 202 may call the function get Current( ) to determine the measured, sensed, or calculated electrical current flowing through the component represented by the network node 602 or the component node 604. The facility controller 202 may call the function get Power( ) to receive or determine the electrical power flowing through the component represented by the network node 602 or the component node 604. The facility controller 202 may then update information (e.g., set parameters) in the network node 602 or the component node 604 with the received or determined electric current or electric power. The network node 602 and the component node 604 may expose additional functions that the facility controller 202 may call to update the information or parameters in the nodes (e.g., set Current( ) or set Power( ). The network node 602 and the component node 604 may expose any suitable functions for determining any electrical property or for setting any parameter (e.g., get Voltage( ) and set Voltage( ).

In certain embodiments, the facility controller 202 models the electric currents and voltages in the facility 100 as complex phasors. The facility controller 202, the network nodes 602, or the component nodes 604 may store the phasors in rectangular form so that the phasors may be added together. The facility controller 202 may impose limits on the magnitude of the current phasors in each component of the facility 100 as a quadratic constraint. For example, the current may be expressed as a phasor: Current=a+jb, where a is a number that expresses that active component of the current, b is a number that expresses the reactive component of the current, and j is defined as the square root of negative one. Additionally, the current may be subject to a quadratic constraint in that $a^2+b^2 \leq c$, where c is the constraint imposed on the magnitude of the current. This constraint may ensure safe operation of the facility 100 (e.g., prevent overloads).

In some instances, the component node 604 represents an active electrical component 404 in the facility 100 that is controllable. The component node 604 may represent a charging station 102 or an HVAC system 218 in the facility 100 that uses at least one variable that can be adjusted to adjust the operation of the component. For example, a variable may indicate the pilot signal in amps communicated to an electric vehicle through a charging station. This pilot signal is an upper bound on the current that the electric vehicle may draw from the charging station. By adjusting this variable, the facility controller 202 can adjust the current draw of the charging station. As another example, a variable may indicate the temperature setpoint of the HVAC system 218. The component node 604 may expose a function get Variables( ) that the facility controller 202 may call to receive or determine the variables that control the operation of the active electrical component 404 represented by the component node 604. In some instances, the facility controller 202 may also determine the value of these variables by calling the get Variables( ) function. The facility controller 202 may update the component node 604 with the variables or the values of the variables received or determined by calling the get Variables( ) function. In some embodiments, the component node 604 exposes a function (e.g., set Variables( ) that the facility controller 202 calls to update the variable values. In this manner, the component node 604 is updated with information indicating the operation of the active electrical component 404 represented by the component node 604.

The facility controller 202 receives a control strategy 606. As discussed previously, the control strategy 606 may indicate one or more objectives desired by an administrator of the facility 100. The facility controller 202 may adjust electric current or power flow in the facility 100 to achieve the objectives indicated by the control strategy 606. The facility controller 202 may analyze the updated network node 602 and the update component node 604 according to an optimization process to determine how to adjust the electric current or power flow through the facility 100 to achieve the objectives indicated by the control strategy 606. In the example of FIG. 6, the facility controller 202 analyzes the network node 602, component node 604, and the control strategy 606 to determine an adjustment 418 to the electric current or electric power flow in the facility 100. The facility controller 202 may generate and dispatch set points to various components in the facility 100 to implement the determined adjustment 418.

As an example operation, if the control strategy 606 indicates an objective of reducing the energy costs of the facility 100, the facility controller 202 may determine that the electric current draw from the electrical infrastructure 204 or the electrical grid may need to be reduced or cut. The facility controller 202 may call the get Current( ) or get Power( ) functions for a component node 604 representing the electrical infrastructure 204 or the electrical grid to determine the electrical current or power flowing from the electrical infrastructure 204 or electrical grid into the facility 100. The facility controller 202 may determine an adjustment 418 that reduces or eliminates the electric power consumption of the facility 100 from the electrical grid. To make up for this loss of electric current or power from the external grid, the facility controller 202 may determine that the electrical current or power produced by alternative energy sources at the facility 100 should be increased. For example, the facility controller 202 may increase the electrical current or power drawn from the solar collectors 104 or the battery 106 in the facility 100. The adjustments 418 may indicate the increase to the electrical current, or power drawn from the solar collectors 104 or the battery 106. The adjustment 418 may also indicate that an HVAC system 218 in the facility 100 should have its thermostat adjusted so that the HVAC system 218 runs less frequently. The facility controller 202 may make this adjustment 418 by adjusting the temperature set points of the HVAC system 218. By making these adjustments 418, the facility controller 202 reduces the energy cost of the facility 100, in certain embodiments.

As another example, if the control strategy 606 indicates an objective of reducing the time to charge one or more electric vehicles, the facility controller 202 may seek to maximize the electrical current or power draw of electric vehicle charging stations 102 by calculating an adjustment 418. If doing this would cause the current, power, or voltage limit of one or more network nodes 502, 504, 506, or 508, the facility controller may including in adjustment 418 that the current or power output of thermal storage 212, the fuel cell 214, the battery 106, the solar collectors 104, or the generator 210 in the facility 100 should increase. The facility controller 202 dispatches set points that affect these adjustments 418 to increase the electrical power provided to the facility 100 to the electric vehicles charging at the charging stations 102. In this manner, the facility controller 202 reduces the time it takes for a charging station 102 to charge an electric vehicle, in certain embodiments. In some embodiments, the facility controller 202 may adjust the electric current or power provided through a charging station 102 based on the type of vehicle that is plugged into the charging station 102. For example, the facility controller 202 may reduce the electric power draw for a vehicle that does not need as much power to recharge.

In certain embodiments, the facility controller 202 may comply with electric limits when determining the adjustments 418. For example, if a passive electric component in the facility 100 has an electric current limit, electric power limit, or an electric voltage limit (e.g., to prevent overloading the component), the facility controller 202 will not determine an adjustment 418 that causes the passive electrical component to violate these limits. Stated differently, the facility controller 202 may take into account these limits of the passive electrical component when using the optimization process to determine the adjustment 418. For example, the network node 602 representing the passive electrical component may include information about the electric limits that are applicable to the passive electrical component. The facility controller 202 considers this information in the network node 602 when determining the adjustment 418.

In some embodiments, the facility controller 202 implements a post processing strategy 608 to determine additional adjustments 418. This post processing strategy may be an ongoing process that updates the adjustments 418 as conditions at the facility 100 change (e.g., as vehicles connect and disconnect from charging stations 102, as the sun moves into different positions during the day, etc.). For example, the post processing strategy 608 may indicate adjustments 418 that should be made to variables affecting the operation of the component nodes 604 after the adjustments 418 to the electrical current or power draw in the facility 100 have been made. For example, the post processing strategy 608 may indicate an adjustment 418 to the charging rate of the charging stations 102. As another example, a post processing strategy 608 may indicate an adjustment 418 to the thermostat settings of the HVAC system 218. The facility controller 202 may dispatch set points to affect these adjustments 418 determined through the post processing strategy 608. In this manner, the facility controller 202 adjusts the values of variables for active electrical components 404, in certain embodiments.

Figure 7:
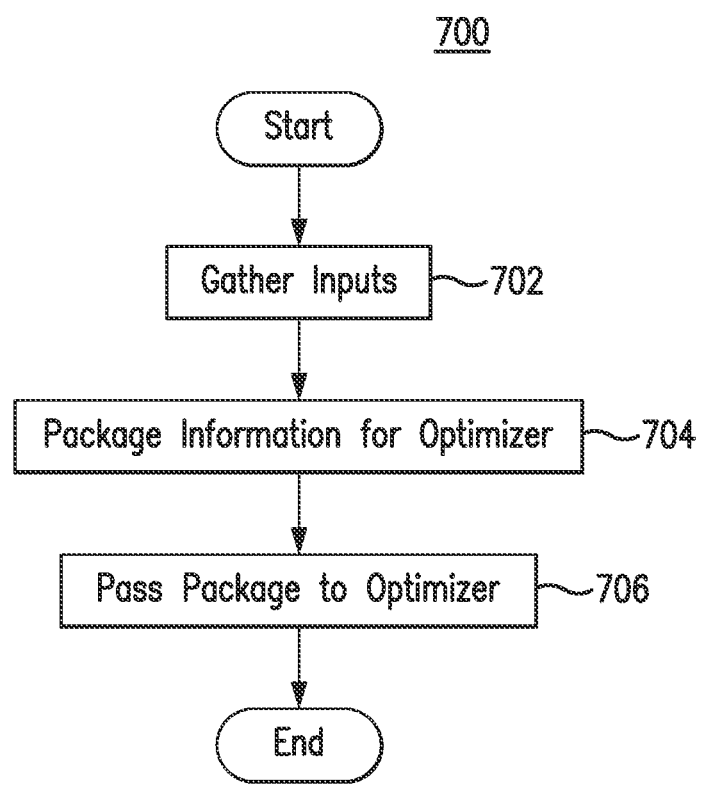
FIG. 7 is a flowchart of an example method performed in electric vehicle charging facility of FIG. 1.

FIG. 7 is a flowchart of an example method 700 performed in the electric vehicle charging facility 100 of FIG. 1. In certain embodiments, the facility controller 202 performs the method 700. For example, a switchboard 302 of the facility controller 202 may perform the method 700 in some aspects. By performing the method 700, the facility controller 202 gathers information about the electric current or power flow in the facility 100.

In block 702, the facility controller 202 gathers inputs. The facility controller 202 may use one or more sensors 226 to measure or sense electric current or power flowing through the facility 100. For example, the sensors 226 may measure the electric current or power flowing through active electrical components and passive electrical components in the facility 100. After the sensors 226 have measured or sensed the electric current or power for the active electrical components and passive electrical components, the sensors 226 may communicate these signals to the facility controller 202. The facility controller 202 may use the information communicated in these signals as gathered inputs.

In block 704, the facility controller 202 packages the information from the sensors 226 for an optimizer 304 of the facility controller 202. The optimizer 304 may be a module or component of the facility controller 202 that determines adjustments to the electric current or power flowing in the facility 100 using the information measured by the sensors 226 and the graph 408. In some embodiments, the facility controller 202 packages the information from the sensors 226 by generating a message that encapsulates the information from one or more sensors 226.

In block 706, the facility controller 202 passes the packaged information to the optimizer 304. For example, the facility controller 202 may communicate the packaged information to the optimizer 304 through a network 220. The optimizer 304 may analyze the packaged information to determine adjustments to be made to the electric current or power flowing through the facility 100.

Figure 8:
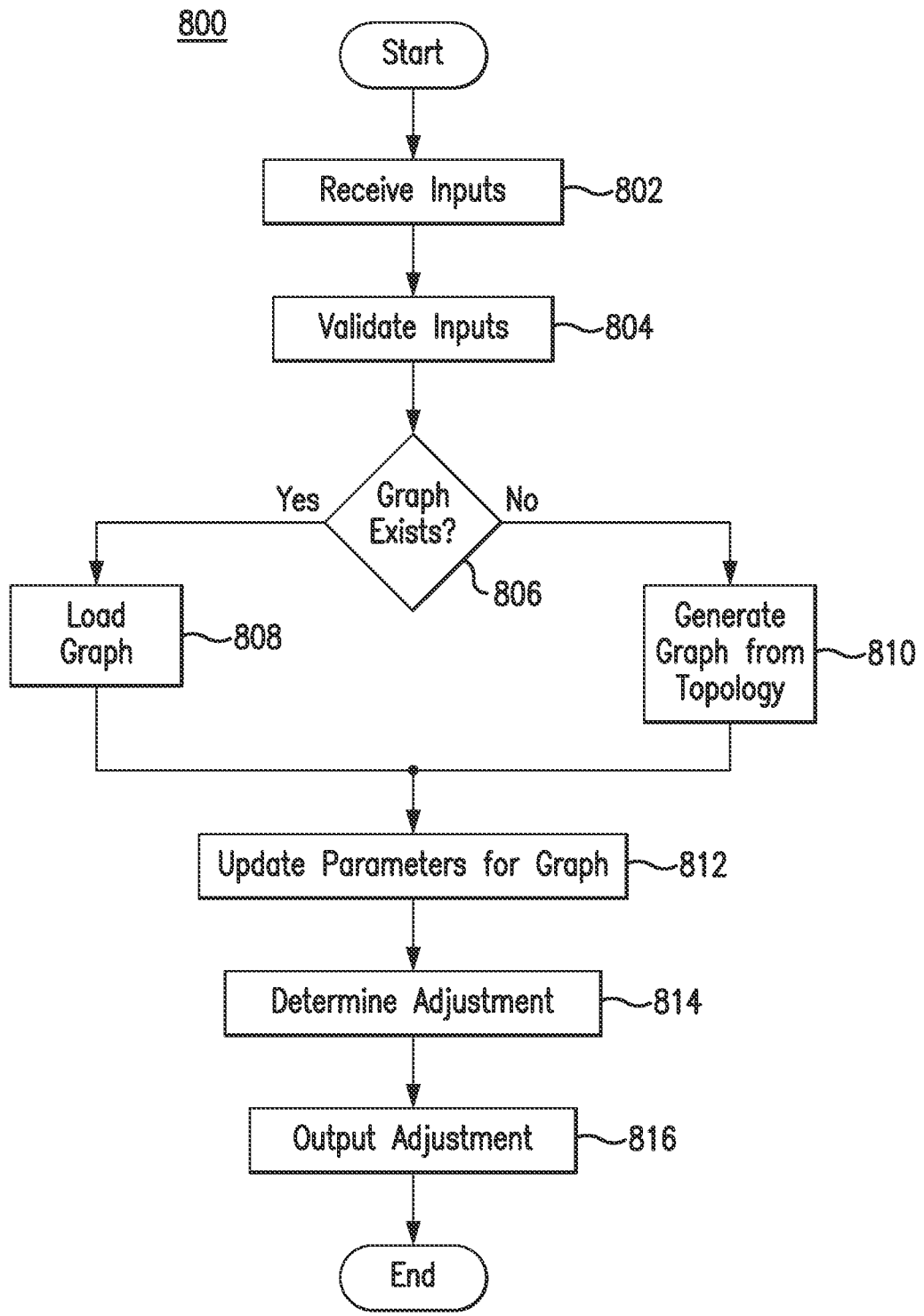
FIG. 8 is a flowchart of an example method performed in electric vehicle charging facility of FIG. 1.

FIG. 8 is a flowchart of an example method 800 performed in the electric vehicle charging facility 100 of FIG. 1. In particular embodiments, the facility controller 202 performs the method 800. For example, an optimizer 304 of the facility controller 202 may perform the method 800 in some aspects. By performing the method 800, the facility controller 202 determines adjustments 418 to the electrical current or power flowing through the facility 100.

In block 802, the facility controller 202 receives inputs. The inputs may have been the measured or sensed electrical current or power flowing in the facility 100. The inputs may have been provided to the optimizer 304 of the facility controller 202 by the switchboard 302 of the facility controller 202. In block 804, the facility controller 202 validates the inputs that were provided in block 802. For example, the facility controller 202 may analyze the inputs to determine if the inputs are within particular bounds. If the inputs are with certain bounds, then the facility controller 202 may proceed using those inputs. If the inputs exceed those bounds, then the facility controller 202 may throw an error or exception and stop the method 800. As an example, the facility controller 202 may determine whether a measured current or power in the facility 100 is below particular thresholds. If the measured current or power exceeds the threshold, then the facility controller 202 may determine that there is an error in measuring or sensing that current or power. For example, the measured current or power may exceed any possible current or power flowing in the facility 100. The facility controller 202 may throw an error or an exception, which may cause the one or more sensors 226 to re-measure or re-sense the electrical current or power flowing in the facility 100.

In block 806, the facility controller 202 determines whether a graph 408 exists for the facility 100. If the graph 408 was previously generated, then the facility controller 202 may load the graph 408 in block 808. If the graph 408 does not yet exist, then the facility controller 202 may proceed to generate the graph 408 from an electrical topology 402 of the facility 100 in block 810. The facility controller 202 may analyze the electrical topology 402 to construct or generate the graph 408. The electrical topology 402 may indicate the active electrical components 404, the passive electrical components 406, and the connection between the active electrical components 404 and passive electrical components 406 in the facility 100. The electrical topology 402 may have been provided by an administrator of the facility 100. The facility controller 202 may analyze the electrical topology 402 to generate the nodes in the graph 408 and the connections between the nodes in the graph 408. For example, the facility controller 202 may generate network nodes 602 representing passive electrical components 406 in the facility 100 (e.g., a line, transformer, breaker). The facility controller 202 may also generate component nodes 604 representing active electrical components 404 in the facility 100 (e.g., a charging station 102, a solar energy collection system, an energy storage system, a building load, a heating, ventilation, and air conditioning (HVAC) system, a fuel cell, a thermal storage system, or a generator). The facility controller 202 may connect the network node 602 and component node 604 to represent the connections between the active electrical components 404 and passive electrical components 406 in the facility 100. Some of the component nodes 604 may be child nodes of the network nodes 602, and vice versa.

In block 812, the facility controller 202 updates parameters for the graph 408. For example, the facility controller 202 may call exposed functions for the network nodes 602 and component nodes 604 in the graph 408. These function calls may return electrical characteristic data. For example, the function calls may return the electrical current or power flowing through the active electrical components 404 or the passive electrical components 406 represented by the network nodes 602 and component nodes 604. These components may form part of a multiphase electrical system. The facility controller 202 may then update the information in the network nodes 602 and component nodes 604 to indicate the electrical current or electrical power flowing through the active electrical components 404 and passive electrical components 406 represented by the network nodes 602 and component nodes 604. The facility controller 202 produces an updated graph 414 by updating these parameters. In some embodiments, the current or power flowing through one of the passive electrical components is a sum of the electric current or power produced or consumed by the active electrical components connected to the passive electrical components.

In block 814, the facility controller 202 determines an adjustment 418 to be made to the facility 100. The facility controller 202 may use an optimization process 416 to determine the adjustment 418. For example, an administrator of the facility controller 202 may provide a control strategy 412 that indicates one or more desired objectives (e.g., an objective of reducing energy costs of the electric vehicle charging facility, an objective of charging using only solar energy, an objective of reducing greenhouse gas emissions, an objective of responding to demand response events, an objective of reducing load variations, an objective of not exporting energy to a grid, or an objective of reducing time to charge an electric vehicle). The facility controller 202 may analyze the updated graph 414 according to the optimization process 416 to determine adjustments 418 to the electric current or power in the facility 100 to achieve the objectives indicated by the control strategy 412. In block 816, the facility controller 202 outputs the determined adjustments 418. In some embodiments, the facility controller 202 determines and dispatches set points (e.g., electric current limits or electric power targets) to the components within the facility 100 to make the predicated adjustment 418. By dispatching these set points, the facility controller 202 adjusts the electric current or power flowing through the components of the facility 100. By making these adjustments 418, the facility controller 202 adjusts the electric current or power flow in the facility 100 to achieve objectives indicated by the control strategy 412. In certain embodiments, the adjustments 418 may be disregarded by other components in the facility 100. For example, a storage controller 306 may disregard an instruction from the facility controller 202 to discharge a battery 106 to the electrical grid.

Figure 9:
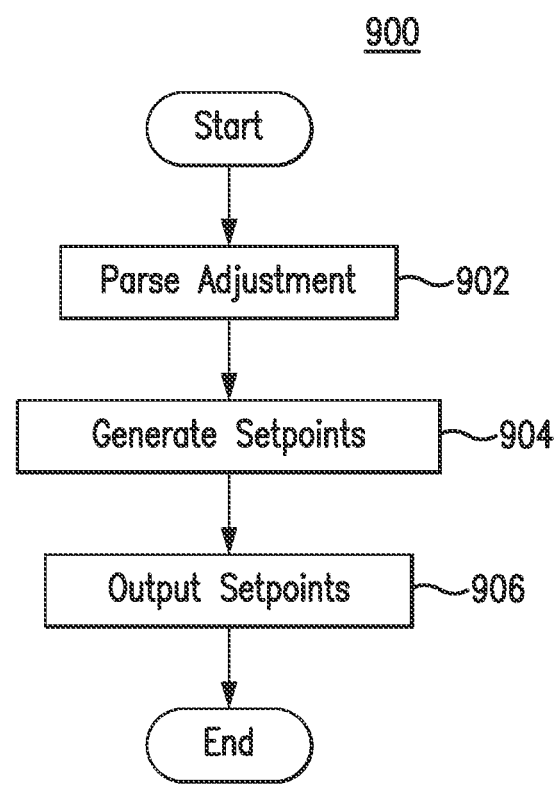
FIG. 9 is a flowchart of an example method performed in electric vehicle charging facility of FIG. 1.

FIG. 9 is a flowchart of an example method 900 performed in the electric vehicle charging facility 100 of FIG. 1. In certain embodiments, the facility controller 202 performs the method 900. Specifically, the switchboard 302 of the facility controller 202 may perform the method 900. By performing the method 900, the facility controller 202 adjusts the electric current and power draw of components in the facility 100 to achieve desired objectives.

In block 902, the facility controller 202 parses a determined adjustment 418. As discussed previously, the facility controller 202 may determine the adjustments 418 according to an optimization process 416. The facility controller 202 parses the adjustment 418 to determine what kinds of adjustments need to be made in the facility 100.

In block 904, the facility controller 202 generates set points for various components in the facility 100 based on the parsed adjustments. The set points may indicate a desired operation of these components in the facility 100. In block 906, the facility controller 202 outputs or dispatches the set points to the components in the facility 100. By outputting or dispatching these set points, the facility controller 202 adjusts the electric current or power flow in the facility 100, according to the determined adjustment 418. By making the adjustment 418, the facility controller 202 adjusts the electric current or power flow in the facility 100 to achieve desired objectives indicated by a control strategy 412.

In summary, a facility controller 202 that operates an electric vehicle charging facility 100 generates a graph 408 with nodes that represent different electrical components (e.g., passive electrical components 406 and active electrical components 404) in the electric vehicle charging facility 100. The facility controller 202 uses this graph 408 to analyze the electricity usage in the electric vehicle charging facility 100. The facility controller 202 may analyze the graph 408 to determine adjustments 418 to the operation of the electric vehicle charging facility 100 to accomplish a desired objective or goal. The facility controller 202 then adjusts the operation of the electric vehicle charging facility 100 (e.g., adjusting the flow of electric current in the electric vehicle charging facility 100) using the determined adjustment 418. In this manner, the facility controller 202 quickly and efficiently optimizes the operation of the electric vehicle charging facility 100 to achieve desired objectives.

Example Clauses

Implementation examples are described in the following numbered clauses:

Clause 1: A method for controlling electrical components at an electric vehicle charging facility. The method includes building a graph representing an electrical topology of the electric vehicle charging facility. The graph includes one or more network nodes representing one or more passive electric components in the electric vehicle charging facility and one or more component nodes representing one or more active electric components in the electric vehicle charging facility that produce or consume electric power. The method also includes producing an updated graph by updating a state of the one or more network nodes based on electric current or power flow through the one or more passive electric components and updating a state of the one or more component nodes based on electric current or power produced or consumed by the one or more active electric components. The method further includes receiving a selected control strategy for the electric vehicle charging facility and adjusting an electric current or a power draw of an electric vehicle charging station in the electric vehicle charging facility based on the updated graph and the selected control strategy.

Clause 2: The method of Clause 1 wherein the selected control strategy includes at least one of an objective of reducing energy costs of the electric vehicle charging facility, an objective of charging using only solar energy, an objective of reducing greenhouse gas emissions, an objective of responding to demand response events, an objective of reducing load variations, an objective of not exporting energy to a grid, or an objective of reducing time to charge an electric vehicle.

Clause 3: The method of any of Clauses 1-2 wherein the one or more active electric components include a solar energy collection system, an energy storage system, a building load, a heating, ventilation, and air conditioning (HVAC) system, a fuel cell, a thermal storage system, or a generator.

Clause 4: The method of any of Clauses 1-3, further including adjusting an electric current or a power draw of the one or more active electric components of the electric vehicle charging facility.

Clause 5: The method of any of Clauses 1-4 wherein the one or more component nodes are one or more child nodes of the one or more network nodes in the graph and wherein the electric current or power flowing through the one or more passive electric components is based on the electric current or power produced or consumed by the one or more active electric components.

Clause 6: The method of any of Clauses 1-5 wherein adjusting the electric current or power flow is further based on at least one of an electric current limit, an electric power limit, or an electric voltage limit of the one or more passive electric components.

Clause 7: The method of any of Clauses 1-6 wherein adjusting the electric current includes disregarding, by a storage controller in the electric vehicle charging facility, a determination that a battery in the electric vehicle charging facility should be discharged to a grid.

Clause 8: The method of any of Clauses 1-7 wherein adjusting the electric current or power draw of the electric vehicle charging station is performed according to a control strategy as an optimization.

Clause 9: The method of any of Clauses 1-8 wherein the state of one or more network nodes includes an electric current flow through or a voltage of each line of a multiphase electrical system.

Clause 10: A system for controlling electrical components at an electric vehicle charging facility. The system includes a memory and one or more processors communicatively coupled to the memory. The one or more processors build a graph representing an electrical topology of the electric vehicle charging facility. The graph includes one or more network nodes representing one or more passive electric components in the electric vehicle charging facility and one or more component nodes representing one or more active electric components in the electric vehicle charging facility that produce or consume electric power. The one or more processors also produce an updated graph by updating a state of the one or more network nodes based on electric current or power flow through the one or more passive electric components and updating a state of the one or more component nodes based on electric current or power produced or consumed by the one or more active electric components. The one or more processors further receive a selected control strategy for the electric vehicle charging facility and adjust an electric current or a power draw of an electric vehicle charging station in the electric vehicle charging facility based on the updated graph and the selected control strategy.

Clause 11: The system of Clause 10 wherein the selected control strategy includes at least one of an objective of reducing energy costs of the electric vehicle charging facility, an objective of charging using only solar energy, an objective of responding to demand response events, an objective of reducing load variations, an objective of not exporting energy to a grid, or an objective of reducing time to charge an electric vehicle.

Clause 12: The system of any of Clauses 10-11 wherein the one or more active electric components includes a solar energy collection system, an energy storage system, a building load, an HVAC system, a fuel cell, a thermal storage system, or a generator.

Clause 13: The system of any of Clauses 10-12 wherein the one or more processors further adjust an electric current or a power draw of the one or more active electric components of the electric vehicle charging facility.

Clause 14: The system of any of Clauses 10-13 wherein the one or more component nodes are one or more child nodes of the one or more network nodes in the graph and wherein the electric current or power flowing through the one or more passive electric components is based on the electric current or power produced or consumed by the one or more active electric components.

Clause 15. The system of any of Clauses 10-14 wherein adjusting the electric current in the electric vehicle charging facility is further based on at least one of an electric current limit, an electric power limit, or an electric voltage limit of the one or more passive electric components.

Clause 16: The system of any of Clauses 10-15 wherein adjusting the electric current or power draw includes disregarding, by a storage controller in the electric vehicle charging facility, a determination that a battery in the electric vehicle charging facility should be discharged to a grid.

Clause 17: An electric vehicle charging facility includes one or more electric vehicle charging stations, one or more active electric components, one or more passive electric components, and a facility controller that includes a memory and one or more processors communicatively coupled to the memory. The one or more processors build a graph representing an electrical topology of the electric vehicle charging facility. The graph includes one or more network nodes representing the one or more passive electric components and one or more component nodes representing the one or more active electric components. The one or more processors also produce an updated graph by updating a state of the one or more network nodes based on electric current or power flow through the one or more passive electric components and updating a state of the one or more component nodes based on electric current or power produced or consumed by the one or more active electric components, receive a selected control strategy for the electric vehicle charging facility, and adjust an electric current or a power draw of the one or more electric vehicle charging stations based on the updated graph and the selected control strategy.

Clause 18: The electric vehicle charging facility of Clause 17 wherein the selected control strategy includes at least one of an objective of reducing energy costs of the electric vehicle charging facility, an objective of charging using only solar energy, an objective of reducing greenhouse gas emissions, an objective of responding to demand response events, an objective of reducing load variations, an objective of not exporting energy to a grid, or an objective of reducing time to charge an electric vehicle.

Clause 19: The electric vehicle charging facility of any of Clauses 17-18 wherein the one or more active electric components includes a solar energy collection system, an energy storage system, a building load, an HVAC system, a fuel cell, a thermal storage system, or a generator.

Clause 20: The electric vehicle charging facility of any of Clauses 17-19 wherein the one or more processors are further configured to adjust an electric current or a power draw of the one or more active electric components of the electric vehicle charging facility.

Clause 21: A processing system, comprising: a memory comprising computer-executable instructions; and a processor configured to execute the computer-executable instructions and cause the processing system to perform a method in accordance with any one of Clauses 1-9.

Clause 22: A processing system, comprising means for performing a method in accordance with any one of Clauses 1-9.

Clause 23: A non-transitory computer-readable medium comprising computer-executable instructions that, when executed by a processor of a processing system, cause the processing system to perform a method in accordance with any one of Clauses 1-9.

Clause 24: A computer program product embodied on a computer-readable storage medium comprising code for performing a method in accordance with any one of Clauses 1-9.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein include one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for controlling electrical components at an electric vehicle charging facility, the method comprising:
building a graph representing an electrical topology of the electric vehicle charging facility, the graph comprising one or more network nodes representing one or more passive electric components in the electric vehicle charging facility and one or more component nodes representing one or more active electric components in the electric vehicle charging facility that produce or consume electric power;
producing an updated graph by:
updating a state of the one or more network nodes based on electric current or power flow through the one or more passive electric components; and
updating a state of the one or more component nodes based on electric current or power produced or consumed by the one or more active electric components;
receiving a selected control strategy for the electric vehicle charging facility; and
adjusting an electric current or a power draw of an electric vehicle charging station in the electric vehicle charging facility based on the updated graph and the selected control strategy.

2. The method of claim 1, wherein the selected control strategy comprises at least one of an objective of reducing energy costs of the electric vehicle charging facility, an objective of charging using only solar energy, an objective of reducing greenhouse gas emissions, an objective of responding to demand response events, an objective of reducing load variations, an objective of not exporting energy to a grid, or an objective of reducing time to charge an electric vehicle.

3. The method of claim 1, wherein the one or more active electric components comprise a solar energy collection system, an energy storage system, a building load, a heating, ventilation, and air conditioning (HVAC) system, a fuel cell, a thermal storage system, or a generator.

4. The method of claim 1, further comprising:
adjusting an electric current or a power draw of the one or more active electric components of the electric vehicle charging facility.

5. The method of claim 1, wherein:
the one or more component nodes are one or more child nodes of the one or more network nodes in the graph; and
the electric current or the power flow through the one or more passive electric components is based on the electric current or the power produced or consumed by the one or more active electric components.

6. The method of claim 1, wherein adjusting the electric current or the power draw is further based on at least one of an electric current limit, an electric power limit, or an electric voltage limit of the one or more passive electric components.

7. The method of claim 1, wherein
adjusting the electric current comprises disregarding, by a storage controller in the electric vehicle charging facility, a determination that a battery in the electric vehicle charging facility should be discharged to a grid.

8. The method of claim 1, wherein adjusting the electric current or the power draw of the electric vehicle charging station is performed according to a control strategy as an optimization.

9. The method of claim 1, wherein adjusting the electric current or the power draw of the electric vehicle charging station is based on a prioritization index.

10. The method of claim 1, wherein
the state of the one or more network nodes comprises an electric current flow through or a voltage of each line of a multiphase electrical system.

11. A system for controlling electrical components at an electric vehicle charging facility, the system comprising:
a memory; and
one or more processors communicatively coupled to the memory, the one or more processors configured to:
build a graph representing an electrical topology of the electric vehicle charging facility, the graph comprising one or more network nodes representing one or more passive electric components in the electric vehicle charging facility and one or more component nodes representing one or more active electric components in the electric vehicle charging facility that produce or consume electric power;
produce an updated graph by:
updating a state of the one or more network nodes based on electric current or power flow through the one or more passive electric components; and
updating a state of the one or more component nodes based on electric current or power produced or consumed by the one or more active electric components; and
receive a selected control strategy for the electric vehicle charging facility; and
adjust an electric current or a power draw of an electric vehicle charging station in the electric vehicle charging facility based on the updated graph and the selected control strategy.

12. The system of claim 11, wherein the selected control strategy comprises at least one of an objective of reducing energy costs of the electric vehicle charging facility, an objective of charging using only solar energy, an objective of responding to demand response events, an objective of reducing load variations, an objective of not exporting energy to a grid, or an objective of reducing time to charge an electric vehicle.

13. The system of claim 11, wherein the one or more active electric components comprise a solar energy collection system, an energy storage system, a building load, a heating, ventilation, and air conditioning (HVAC) system, a fuel cell, a thermal storage system, or a generator.

14. The system of claim 11, wherein the one or more processors are further configured to
adjust an electric current or a power draw of the one or more active electric components of the electric vehicle charging facility.

15. The system of claim 11, wherein:
the one or more component nodes are one or more child nodes of the one or more network nodes in the graph; and
the electric current or the power flow through the one or more passive electric components is based on the electric current or the power produced or consumed by the one or more active electric components.

16. The system of claim 11, wherein to adjust the electric current in the electric vehicle charging facility, the one or more processors are configured to adjust the electric current in the electric vehicle charging facility further based on at least one of an electric current limit, an electric power limit, or an electric voltage limit of the one or more passive electric components.

17. The system of claim 11, wherein to adjust the electric current or the power draw, the one or more processors are configured to disregard, by a storage controller in the electric vehicle charging facility, a determination that a battery in the electric vehicle charging facility should be discharged to a grid.

18. An electric vehicle charging facility comprising:
one or more electric vehicle charging stations;
one or more active electric components;
one or more passive electric components; and
a facility controller comprising a memory and one or more processors communicatively coupled to the memory, the one or more processors configured to:
build a graph representing an electrical topology of the electric vehicle charging facility, the graph comprising one or more network nodes representing the one or more passive electric components and one or more component nodes representing the one or more active electric components;
produce an updated graph by updating a state of the one or more network nodes based on electric current or power flow through the one or more passive electric components and updating a state of the one or more component nodes based on electric current or power produced or consumed by the one or more active electric components;
receive a selected control strategy for the electric vehicle charging facility; and
adjust an electric current or a power draw of the one or more electric vehicle charging stations based on the updated graph and the selected control strategy.

19. The electric vehicle charging facility of claim 18, wherein the selected control strategy comprises at least one of an objective of reducing energy costs of the electric vehicle charging facility, an objective of charging using only solar energy, an objective of reducing greenhouse gas emissions, an objective of responding to demand response events, an objective of reducing load variations, an objective of not exporting energy to a grid, or an objective of reducing time to charge an electric vehicle.

20. The electric vehicle charging facility of claim 18, wherein the one or more active electric components comprise a solar energy collection system, an energy storage system, a building load, a heating, ventilation, and air conditioning (HVAC) system, a fuel cell, a thermal storage system, or a generator.

\* \* \* \* \*